July 18, 1933.  J. E. HOFFMAN  1,918,391
HITCH
Filed Jan. 19, 1931
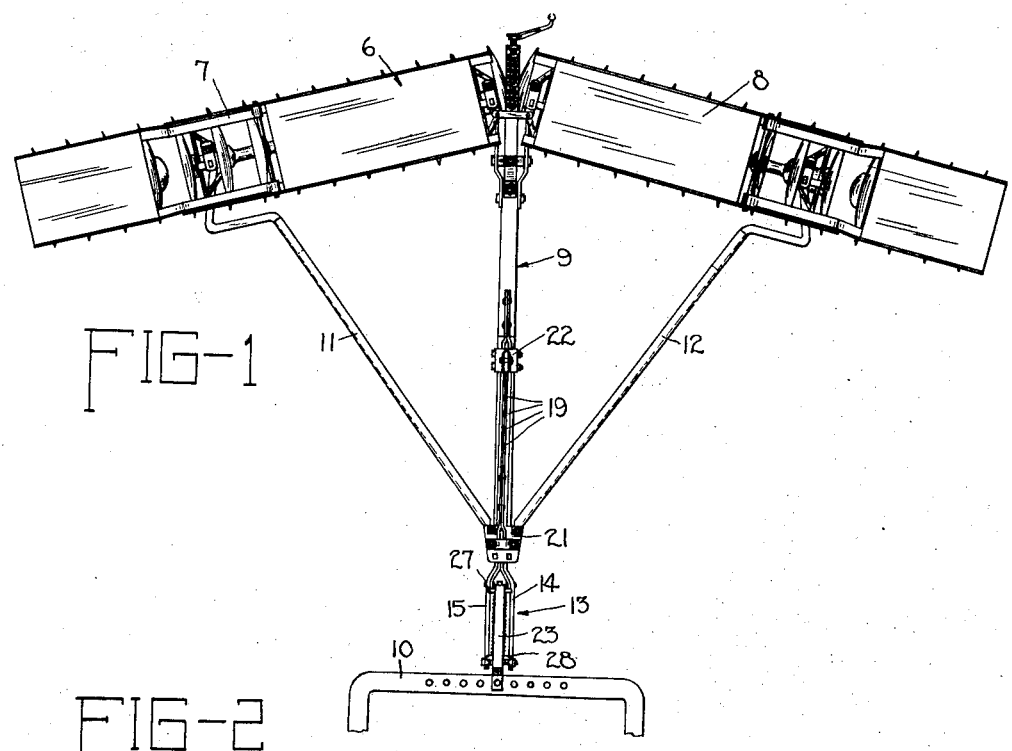
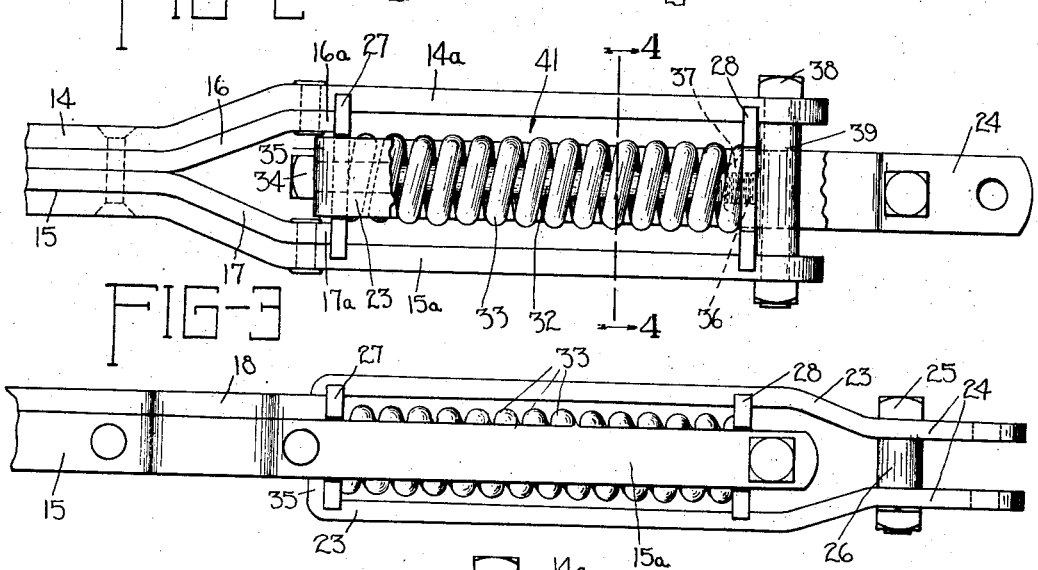
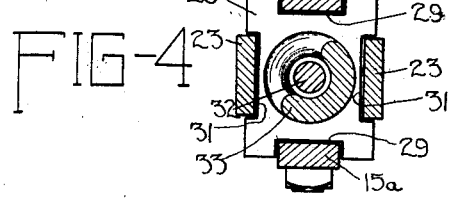
INVENTOR
John E. Hoffman
BY Brown, Jackson,
Boettcher & Dienner
ATTORNEY Patented July 18, 1933

1,918,391

UNITED STATES PATENT OFFICE

JOHN E. HOFFMAN, OF MOLINE, ILLINOIS, ASSIGNOR TO DEERE & COMPANY, OF MOLINE, ILLINOIS, A CORPORATION OF ILLINOIS

HITCH

Application filed January 19, 1931. Serial No. 509,583.

This invention relates to a spring cushioning hitch device, and is more particularly directed to a hitch device of the character utilized for connecting an agricultural implement to a tractor. There are certain agricultural implements which are so constructed as to have a preparatory operation or adjustment performed upon them by applying a backward thrust on the pulling member or draft bar thereof. An implement of the aforesaid type has been illustrated in the drawing to show the general application of the hitch device comprising the present invention to such an implement.

The primary object of the present invention is to provide a means for hitching an implement to a tractor, which will function to cushion and yieldingly transmit the draft force of the pulling vehicle or tractor as the latter overcomes the static or draft load of the pulled vehicle or implement, and which will function in the same capacity of cushioning and absorbing the shock of the backward thrust when the pulling vehicle is backed up relative to the pulled vehicle.

Another object of the invention is to provide a hitching means of the above described character, wherein a single spring is utilized to cushion and yieldingly transmit the draft force of the pulling vehicle when the latter operates in either direction of motion, namely, whether it is pulling or pushing the pulled vehicle.

Another object is to provide means whereby the spring will cushion and absorb the shocks in compression for both directions of travel of the pulling vehicle.

Another object of the invention is to provide a spring cushioning hitch device that will operatively function to cushion the forward draft force or backward thrust for all positions of the draft bar of the pulled vehicle with respect to the draw bar of the pulling vehicle.

A still further object is to construct the hitch device, comprising the present invention, of comparatively simple and durable parts, which may be easily manufactured at low cost, and which are readily replaceable when worn, or in the event that breakage should occur.

Other objects and advantages of the invention will hereinafter appear in the following detailed description of a preferred embodiment of the invention.

In the drawing illustrating such embodiment:

Figure 1 is a general plan view of a disk harrow embodying a hitch device of the present invention, the latter being associated with the draft tongue thereof and connected to a tractor draw bar;

Figure 2 is a plan view on an enlarged scale of the hitch device with a portion thereof broken away to expose the cushioning spring and the associated parts;

Figure 3 is a side elevational view of the hitch device as illustrated in Figure 2, and Figure 4 is a cross sectional view taken transversely of the hitch device along line 4—4 of Figure 2 and looking in the direction of the arrows.

Although a preferred embodiment of the invention is illustrated and described as associated with a disk harrow, this is only by way of example as it is entirely within the scope of the invention to utilize the same between any two pulling and pulled vehicles to function in the capacity for which it is devised.

The disk harrow 6 illustrated in Figure 1 comprises a pair of gangs 7 and 8 disposed substantially abreast of each other in oppositely extending relation, a central or intermediate draft tongue 9, and two outwardly extending lateral draft members 11 and 12. Briefly, the disk harrow 6 is of the type wherein the propelling power of the tractor is utilized for angling and straightening the disk gangs 7 and 8, the latter being accomplished when the tractor is moving ahead or when it is backing rearwardly. In order to cushion the force of the draft on the forward pull of the tractor, or to cushion the backward thrust of the tractor, a hitch device constructed in accordance with the present invention is utilized. The hitch device is designated 13 and may be secured to the draft tongue 9 in any desired manner. In this particular construction, the double action hitch has been built into the harrow as a unitary part thereof. It is mounted between two outer side members 14 and 15 constituting two of the four bar members which are riveted together to form an attachment means or hitch, as a portion of the draft tongue 9. The two inner bar members 16 and 17 are of greater width than bar members 14 and 15 so as to project above the latter bars as at 18, and are provided with notches 19 in the projected portions thereof for the reception of plungers carried by the latches 21 and 22. The function of backing and the use of latches 21 and 22 is clearly set forth in the copending application of Charles H. White, Serial No. 312,325, filed October 13, 1928. It is obvious that, although the double action hitch has been mounted on the draft tongue of the harrow in the manner aforesaid, the four bars 14, 15, 16 and 17 may be cut to any desired length and may be bolted or otherwise secured in any suitable manner to the draft tongue of any vehicle.

Referring now to Figures 2, 3 and 4 it is seen that the bars 14 and 15 are spread apart to form a frame between which the double acting hitch mechanism is supported. The hitch mechanism comprises a U-shaped hitch member 23 having its free ends 24 connected by means of a bolt 25 and properly spaced by means of a sleeve 26. The hitch member 23 is positioned for endwise movement by means of the plates 27 and 28. Each of the foregoing plates are provided with oppositely disposed cut-outs or slots on two faces thereof as at 29, within which bars 14 and 15 are free to move, the plates being further provided with another pair of cut-outs or slots 31 which are cut into the other side faces thereof, and within which the two legs of hitch member 23 are loosely disposed. In this manner plates 27 and 28 are slidably guided between the projecting ends of the frame bars which constitute guides 14a and 15a, while the hitch member 23 is slidably mounted within the slots 31 in said plates. A through bolt 32 is disposed centrally between the guides 14a and 15 and centrally between the legs of hitch member 23. The threaded end 36 of the bolt, is screwed into plate 28 while its shank end is loosely carried for endwise movement in aligned openings in plate 27 and in the bent over end 35 of the hitch member 23. A boss 37 projects from the central portion of the plate 28 to increase the length of the threaded opening for receiving the bolt 32. A shock absorbing compression spring 33 is interposed between the two plates 27—28, and embraces bolt 32. This spring is at all times acting to force plates 27 and 28 apart. The distance between plates 27 and 28 may be varied to a limited extent if desired. This is determined by the distance that the threaded end 36 of bolt 32 is screwed into plate 28 and its projecting boss 37, as is apparent from the fact that the head 34 of bolt 32 abuts one side of the bent over end 35 of the hitch member, while plate 27 bears against the opposite side of the latter through the action of spring 33.

From the foregoing it will be seen that the double action hitch mechanism, comprising members 23, 27, 28, 32 and 33, is an independent unit which is inserted between the guide ends 14a and 15a of bars 14 and 15, and operates therebetween. In order to effect the proper spring cushioning action, plates 27 and 28 must only be allowed to move against the outward action of the spring. It necessarily follows that one of said plates must always be held against movement as the other of said plates is forced against the action of the spring and vice versa. This is accomplished in the following manner: The ends of the inner bars 16 and 17 are made to follow the contour of the outer bars 14 and 15, and are cut short with their ends riveted to the latter thereby providing abutments or stops 16a and 17a against which plate 27 is disposed. This prevents movement of plate 27 in one direction. Movement of plate 28 in one direction is prevented by means of a bolt 38 that extends through aligned openings in the ends of bars 14 and 15. Bolt 38 also extends through a sleeve 39 which serves to properly space the ends of bars 14 and 15 and acts as a stop for plate 28 which is disposed adjacently to the sleeve. From this construction it is seen that plates 27 and 28 can only move inwardly against the action of spring 33 and away from their respective stops. Furthermore, one plate is always held against movement as the other plate is made to approach it, thereby causing a compression of spring 32.

The double acting hitch device may be easily assembled and connected to the implement or vehicle with which it is utilized. The hitch device may be completely assembled and thereafter connected with a vehicle, or, the connecting draft member comprising bars 14 to 17, inclusive, may first be connected with the vehicle and the double action hitch mechanism, indicated as 41 in its entirety, may be unitarily assembled and thereafter slipped into place between bars 14 and 15, and bolt 38 then inserted through its openings in the ends of the bars and through sleeve 39.

It is also to be noted that the distance between the outwardly disposed faces of plates 27 and 28 may be so adjusted by bolt 32 as to be exactly equal to the distance between the abutments or stops 16a—17a and the adjacent face or edge of sleeve 39, as is best illustrated in Figure 2. It is possible to obtain a limited amount of lost motion between the outwardly disposed faces of plates 27—28 and their respective stops if such is desired under certain conditions. This is accomplished by adjusting bolt 32 as hereinbefore explained, and although the amount of lost motion obtainable is limited in the particular construction shown, it is evident that the length of boss 37 may be increased to take care of a considerable amount of adjustment in the manner aforesaid.

The hitch device is operable for all positions of the draft tongue of the pulled vehicle with respect to the draw bar of the pulling vehicle. Hitch member 23 is only capable of true endwise movement relative to the guide frame comprising members 14a and 15a, as is determined by the plates 27 and 28.

The foregoing description has been confined to the particular construction illustrated in the drawing, and although this represents a preferred embodiment of the invention it is to be understood that various changes in the construction are possible without departing from the metes and bounds of the present invention. Therefore, the invention is not to be specifically limited to the construction illustrated, but only in so far as may be determined by the appended claims.

What I claim is:

1. In a hitch device comprising a supporting frame having stops thereon disposed in spaced relation to each other, a spring confined between said stops, and a hitch member embracing said spring and mounted upon said frame for sliding movement, said hitch member having means for engaging one end of said spring to compress the same when the draft is in a forward direction and having means for engaging the other end of said spring to compress the same when the draft is in a rearward direction.

2. A hitch device comprising a supporting frame, a hitch member, and a shock absorbing mechanism having guide means slidably mounted upon said supporting frame and a spring directly carried by said means within said supporting frame, said supporting frame having means engaging said guide means for compressing said spring in one direction, and said hitch member being connected with said guide means for compressing said spring in the opposite direction.

3. In a hitch device comprising a supporting frame, a hitch member, and a shock absorbing mechanism having a pair of plates slidably mounted upon said supporting frame and a spring disposed between said plates and within said frame, said supporting frame having a stop means to contact and limit the movement of the first plate in one direction, and having a second stop means to contact and limit the movement of said second plate in the opposite direction, said hitch member being connected with said first plate to compress the spring in the one direction, and said supporting frame being adapted to move said second plate in the opposite direction through the instrumentality of one of said stop means to compress said spring in the opposite direction.

4. A hitch device comprising a frame having a draft connection, a pair of plates, means connecting said plates for relative movement with respect to each other and to said frame, a spring carried by said means and interposed between said plates, and hitch means associated with the first of said plates, said frame having means engaging the second of said plates for actuating the same to compress said spring in one direction, and said hitch means being adapted to actuate said first plate to compress said spring in the opposite direction.

5. In a hitch device, a frame adapted to be connected with the draft tongue of a vehicle, said frame comprising a forked member having a first stop means connected with the closed end thereof and a second stop means secured in the open end thereof, and a shock absorbing mechanism comprising a pair of plates slidably guided within said member and disposed between said two stop means, a spring interposed between said plates, and a hitch element cooperating with one of said plates for actuating the same to compress said spring in one direction, and said frame cooperating with the other plate through one of said stop means for actuating said latter plate to compress said spring in the opposite direction.

6. In a hitch device, a frame adapted to be connected with the draft tongue of a vehicle, said frame having stops connected with each end thereof, a pair of plates guided within said frame, and having a spring interposed therebetween to force each of the latter into engagement with each of said stops respectively, and a hitch member associated with the first of said plates and guided for endwise movement by the second of said plates, said hitch member being capable of actuating said first plate away from its corresponding stop to compress said spring in one direction, and said frame being capable of actuating said second plate by means of its corresponding plate stop to compress said spring in the opposite direction.

7. In a hitch device, a frame adapted to be connected with the draft tongue of a vehicle, said frame having stops secured to each end thereof, a pair of plates guided within said frame, a bolt secured to one of said plates and extending through an opening in the other of said plates, a spring embracing said bolt and acting against said plates to force each of the latter into engagement with each of said stops respectively, and a hitch member having one end supported on said bolt adjacent the first plate with its other end guided for endwise movement by the second plate, said hitch member being capable of actuating said first plate away from its corresponding stop to compress said spring in one direction, and said frame being capable of actuating said second plate by means of the corresponding plate stop to compress said spring in the opposite direction.

8. In a hitch device, a hitch member comprising a frame carrying a pair of plates for sliding movement along said frame, a bolt secured to the first of said plates with the second plate slidably mounted on said bolt, a spring supported between said plates, and a second hitch member supported adjacent to the second plate by means of said bolt and guided for endwise movement by means of said plates, and means carried by said frame to impart movement to said first plate for compressing said spring in one direction, said second hitch member cooperating with said second plate to actuate the latter for compressing the spring in the opposite direction.

9. In a hitch device, a hitch member having parallel spaced bars, a pair of plates guided in vertical position between said bars, a shock absorbing mechanism operatively connected with one side of each of said plates, and a second hitch member connected with said mechanism and embracing said plates to be guided thereby exteriorly of said mechanism for endwise movement parallel to the bars of said first hitch member, and means carried by said bars for cooperating with the other sides of said plates whereby said first hitch member is enabled to move one plate for compressing said spring, and said second hitch member is enabled to move the other plate for compressing said spring.

10. A hitch device comprising a pair of hitch members and shock absorbing means operatively connecting said members, said shock absorbing means comprising a pair of spring separated plates connected with one of said members and slidably mounted on the other of said members, and means carried by one of said members for engaging the outer sides of the plates for regulating the movements of said plates against said spring when the hitch members are moved relatively to each other.

11. In a draft tongue having one end connected with a vehicle and with its other end comprising a double pronged fork, the combination of shock absorbing means operatively connected with said fork and slidably carried directly upon the fork prongs of said tongue, and hitch means carried by said shock absorbing means for connection to a second vehicle, said shock absorbing means operating to cushion the force created by relative movement between the draft tongue and hitch means when said force is acting in either direction along the line of draft.

12. In a hitch device, a hitch member having parallel spaced bars, a pair of stops connected with each of said bars in spaced relation to each other, a pair of slotted plates slidably mounted upon said bars and disposed between said stops, resilient means interposed between said plates and within the bars, said resilient means being adapted to act upon said plates to hold the same against their respective stops, and a second hitch member slidably carried within the slots of said plates and operatively connected with said resilient means wherein draft shocks in either direction along the line of draft are dampened when said hitch members are moved relative to each other through said shocks.

13. In a hitch device, a forked hitch member having spaced stops connected therewith, a resilient shock absorbing mechanism, guide means confined between said stops and slidably mounted on said forks to support said resilient shock absorbing mechanism in operative relation to said forks, and a second hitch member slidably mounted directly upon said guide means, said second hitch member having operative connection with said mechanism.

14. In combination with an implement, a forwardly extending draft frame comprising four bars in juxtaposition and forked at their forward ends, the outer bars extending forwardly beyond the ends of the inner bars, bolt means connecting the ends of the extended outer bars, and shock absorbing hitch means connected with said bars and including a pair of spring pressed plates, said bolt beans and the outer ends of said inner bars comprising stops for limiting the movement of said plates.

15. In combination with an implement, a forwardly extending draft frame comprising a plurality of bars, certain of said bars extending forwardly beyond the ends of the other bars, a member connecting the outer ends of said extended bars, and shock absorbing hitch means supported by the bars and comprising a pair of movable spring pressed elements, said connecting member of said extended bars and the ends of said other bars comprising means for retaining said spring pressed elements in operative relation to the bars and to limit the movement of said elements with respect to said bars.

JOHN E. HOFFMAN.

CERTIFICATE OF CORRECTION.

Patent No. 1,918,391. July 18, 1933.

JOHN E. HOFFMAN.

It is hereby certified that error appears in the printed specification of the above numbered patent requiring correction as follows: Page 4, line 55, claim 11, for "with" read "within"; and line 107, claim 14, for "beans" read "means"; and that the said Letters Patent should be read with these corrections therein that the same may conform to the record of the case in the Patent Office.

Signed and sealed this 22nd day of August, A. D. 1933.

M. J. Moore.

(Seal) Acting Commissioner of Patents.